Aug. 30, 1949.    A. J. LOEPSINGER    2,480,487
SPRING SUPPORT FOR PIPES
Filed Aug. 22, 1945
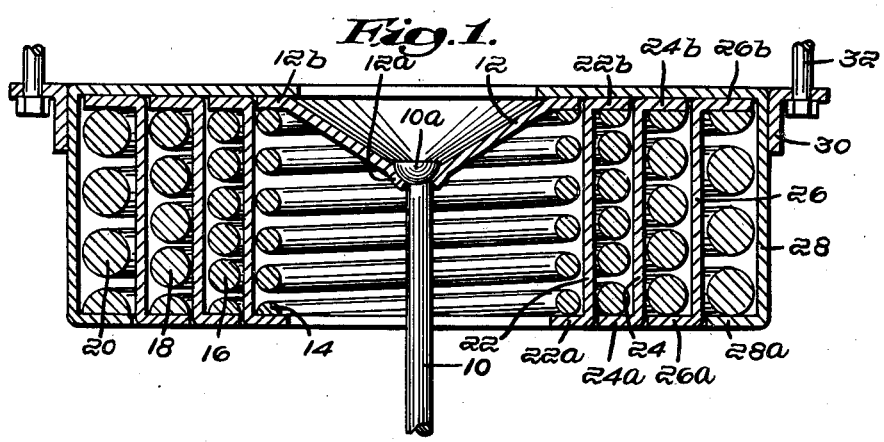
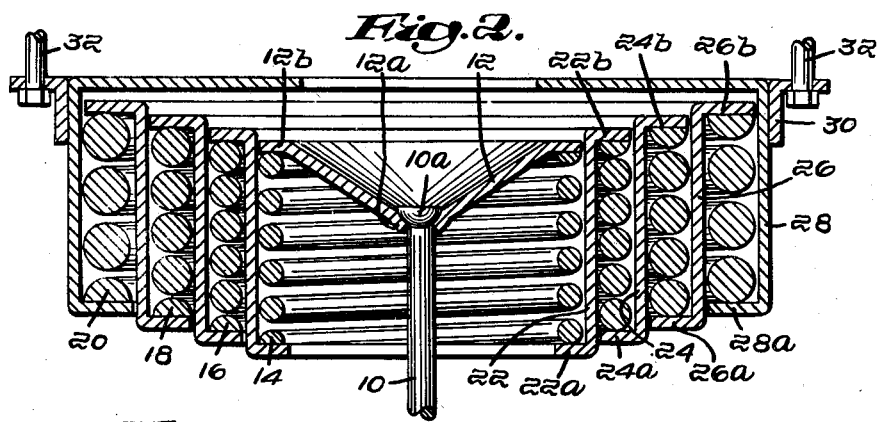
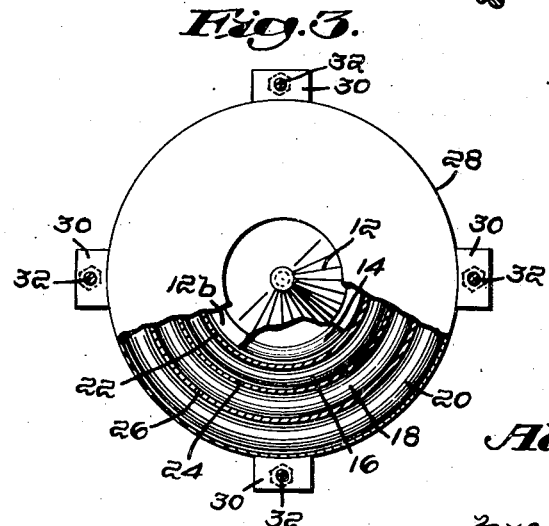
Albert J. Loepsinger,
Inventor:
by Harry Dexter Peck.
Attorney Patented Aug. 30, 1949

2,480,487

UNITED STATES PATENT OFFICE 2,480,487

SPRING SUPPORT FOR PIPES

Albert J. Loepsinger, Providence, R. I., assignor to Grinnell Corporation, Providence, R. I., a corporation of Delaware Application August 22, 1945, Serial No. 612,044

6 Claims. (Cl. 248—54)

This invention relates to improvements in a spring support for pipe. More especially it has to do with a yieldable support for a load of known value which is subject to a predetermined displacement.

An example of such a load is a system of piping in a modern steam power plant, which, during erection and periods of long shut down, would be at room temperature, and during normal operation might be at a temperature of 900° F. or higher. Such large changes in temperature cause the piping to vary in length and the variations in the vertically disposed lines compel the horizontal lines connected therewith to rise and fall appreciably. If the latter lines are rigidly supported the strains imposed upon the pipes and fittings when the lines tend to change position may cause rupture or leakage with all attendant dangers. Should the risers be so short that the displacement of the horizontal pipes is of the order of ½", ordinary spring hangers may safely be used, but frequently risers are of sufficient length to cause a displacement of several inches. In such cases the variation in lifting caused by deformation of a spring of convenient or permissible length, is too great for safety and good practice requires the use of so-called "constant support spring hangers." These have been used with satisfactory results, but those now available are complicated and expensive, usually involving more or less mechanism in addition to the spring elements.

The principal object of this invention is to provide simple, low cost supporting means having a series of spring elements nested one within another with means for transmitting the load from one spring to the other throughout the series. By proper selection of springs the support will have a relatively small over-all vertical dimension, will yield with the pipe as the latter changes its position, and will maintain a substantially constant lifting effect on the pipe as the latter departs from what may be deemed its normal position. The effect is much the same as though a very long spring were employed but because the several springs are nested one within another the vertical extent of my improved support is very much less than if only one spring were used. Indeed, with my improved arrangement of the springs and the distribution of the deflection, a support of the desired characteristics can be provided within any reasonable space limitations.

The best mode in which I have contemplated applying the principles of my invention are shown in the accompanying drawings but these are merely illustrative because it is intended that the patent shall cover by suitable expression in the appended claims whatever features of patentable novelty exist in the inventions disclosed.

In the drawings:

Figure 1 is a medial vertical section through a spring support embodying my improvements, the support being shown without any load applied thereto;

Figure 2 is a similar view, but showing the relation of the various elements when the support is carrying a load in its normal position; and Figure 3 is a plan view, with certain parts broken away and other parts in section.

Referring to the drawings, the support shown is adapted to be attached to some overhead unyielding structure and to support a pipe which hangs below. However, the support is readily adaptable to rest on a base and support a load above it.

As shown, the load may be attached in some suitable manner to a rod 10 having a semi-spherical head 10a resting in a similarly shaped open socket 12a at the center of a dished plate 12. The flat outstanding rim 12b of this plate rests upon the innermost of a series of nested spring elements which are here shown as helical springs 14, 16, 18 and 20.

The innermost spring 14 bottoms on an inwardly extending flange 22a near the bottom of a generally cylindrical sleeve 22 which also has an outwardly extending flange 22b near its upper end. This latter flange rests on the next spring 16 of the series and this spring in turn bottoms on another inwardly extending flange 24a near the lower end of another generally cylindrical sleeve 24. This last mentioned sleeve has an outwardly extending flange 24b near its upper end which rests on the next spring 18 of the series. The lower end of this spring 18 rests on an inwardly extending flange 26a of still another sleeve 26, whose upper outwardly extending flange 26b rests on the top of spring 20, here shown as the outermost spring of the series.

Similarly, other flanged sleeves and other springs may be employed to make up as large a series as may be desired, the several springs and sleeves shown being representative of as many such parts as may be preferred.

The outermost spring (20) of the series bottoms on an inwardly extending flange 28a of the outer shell or casing 28 which at its upper end may be provided with a suitable number of brackets 30 and bolts 32, or other suitable means, for attaching the hanger to some overhead structure (not shown).

Each spring of the series may have the same individual spring constant in which case each spring will be deflected the same amount for any change in the position of the pipe. If, however, the individual spring constants are different, then the deflection of each spring will be in inverse ratio to its constant.

Regardless of whether the constants of the separate springs are alike or different, the constant of the series will always be unchanged because each spring is always active and supporting the load. That is to say, the force of each spring is such that it never bottoms on itself during any part or the whole of the predetermined displacement of the load, but continues at all times to act as a spring. In other words, at any movement of the pipe between the free length of the springs and their solid height (which preferably is reached simultaneously by all the springs), the spring constant of the series remains the same. Thus, as said before, since all the springs are always acting as such, the spring constant of the series does not change throughout the displacement of the load.

This maintenance of each spring in the series as a spring enables the load to be appreciably displaced without materially changing the supporting effect of the hanger, thus making the hanger as a whole the full equivalent of a single long spring. Accordingly the hanger provides marked flexibility in a much shorter over-all vertical dimension than is possible with a long spring or with any series of springs some of which may cease to act as such during the anticipated movement of a load.

By nesting the springs one within the other and transmitting the load from one to the other, the desired small vertical extent of the support is realized. As a further feature of saving vertical space, the several springs may be precompressed when the support is assembled. This would enable a predetermined load to be supported with reduced deflection of the springs, albeit no change in the spring constant of the series or in the operation under load would result.

All of the parts can for the most part be produced without any machining operations. No levers, pivots or other mechanism are required and the action of the support, in its movements, is substantially free from friction. Thus a simple rugged spring support is provided which is not of excessive length, which is inexpensive, and which maintains a substantially constant lifting effect throughout the predetermined displacement of the load.

I claim:

1. A spring support for pipe having a known load and being subject to a predetermined displacement from a normal position, comprising a series of coiled springs nested one within another, an element resting on the top of the innermost spring and having a connection for the pipe to be supported, a flanged element intermediate two adjacent springs of the series having an inwardly extending flange near its bottom upon which the inner of the said two adjacent springs seats and having an outwardly extending flange near its top which seats on the outer of the said two adjacent springs, and a fixed outer casing having an inwardly extending flange near its bottom on which the outermost spring of the series seats; the said springs being of sufficient strength and the flanged elements and casing being arranged for relative movement without interference so that each spring supports the full load throughout the predetermined displacement of the pipe.

2. A spring support for pipe having a known load and being subject to displacement within predetermined limits from a normal position, comprising a series of coiled springs nested one within the other and each of sufficient strength to support the said pipe throughout its displacement, means for applying the load to the innermost spring of the series, means for transmitting the load from the bottom of one spring to the top of the next spring, and a fixed support for the bottom of the outermost spring of the series; the said transmitting means and fixed support being arranged to permit unrestricted relative movement between them whereby each spring continues to support the full load of the pipe throughout its displacement between the said predetermined limits.

3. A spring support for pipe having a known load and being subject to a predetermined displacement from a normal position, comprising a series of helical springs nested one within another, means having connection with said pipe and transmitting the load thereof to the spring at one end of the series, means for transmitting the load from said end spring to the other springs of the series in turn, and an unyielding support for the spring at the other end of the series; the said transmitting means being free to move independently throughout said displacement so that each spring continues yieldingly to support the full load of the pipe throughout its movement from the said normal position.

4. A spring support for pipe having a known load and being subject to a predetermined displacement from a normal position, comprising a series of coiled springs nested one within another; an unyielding support for one end of an end spring of the series; a sleeve within said end spring having an external flange resting on said end spring and spaced from said unyielding support, and having an internal flange for supporting within the sleeve one end of the next nested spring of the series; successive sleeves each having external and internal flanges spaced apart from adjacent sleeves for respectively resting on a spring coiled outside the sleeve and for supporting a spring coiled inside the sleeve; and means resting on the free end of the end spring of said series last to be supported by a sleeve for transmitting the load of the pipe to the last mentioned spring; the said sleeves and the said means for transmitting the pipe load to the end spring being free to move relatively throughout the entire predetermined displacement of the pipe whereby the spring constant of the spring series remains unchanged throughout the entire movement of the pipe from its normal position.

5. A spring support for a pipe having a known load and being subject to a predetermined displacement from a normal position, comprising a series of coiled springs nested one within another, an unyielding support for one end of an end spring of the series, means for transmitting the pipe load to one end of the other end spring of the series, and flanged sleeves interposed between each adjacent pair of springs of the series for transmitting the pipe load from one spring to another; the said unyielding support, the said pipe load transmitting means, and the said flanged sleeves being in spaced relation to permit relative movement of the movable elements whereby within the predetermined displacement of the pipe no spring of the series is compressed to its solid height.

6. A spring support for pipe which has a known load and is subject to displacement within predetermined limits from a normal position, comprising a series of coiled springs nested one within the other, each of sufficient strength to support the load of said pipe throughout its displacement and each spring being precompressed prior to the load of the pipe being applied to the support, means for connecting the pipe to the innermost spring of the series, means for transmitting the load from the bottom of one spring to the top of the next spring, and a fixed support for the bottom of the outermost spring of the series; the said transmitting means and fixed support being spaced apart to permit unrestricted relative movement between them whereby each spring continues to support the load of the pipe throughout its displacement between the said predetermined limits.

ALBERT J. LOEPSINGER.

REFERENCES CITED

The following references are of record in the file of this patent:

UNITED STATES PATENTS

| Number | Name | Date |
| --- | --- | --- |
| 2,363,538 | Loepsinger | Nov. 28, 1924 |

FOREIGN PATENTS

| Number | Country | Date |
| --- | --- | --- |
| 327,631 | Great Britain | Apr. 10, 1930 |